UNITED STATES PATENT OFFICE.

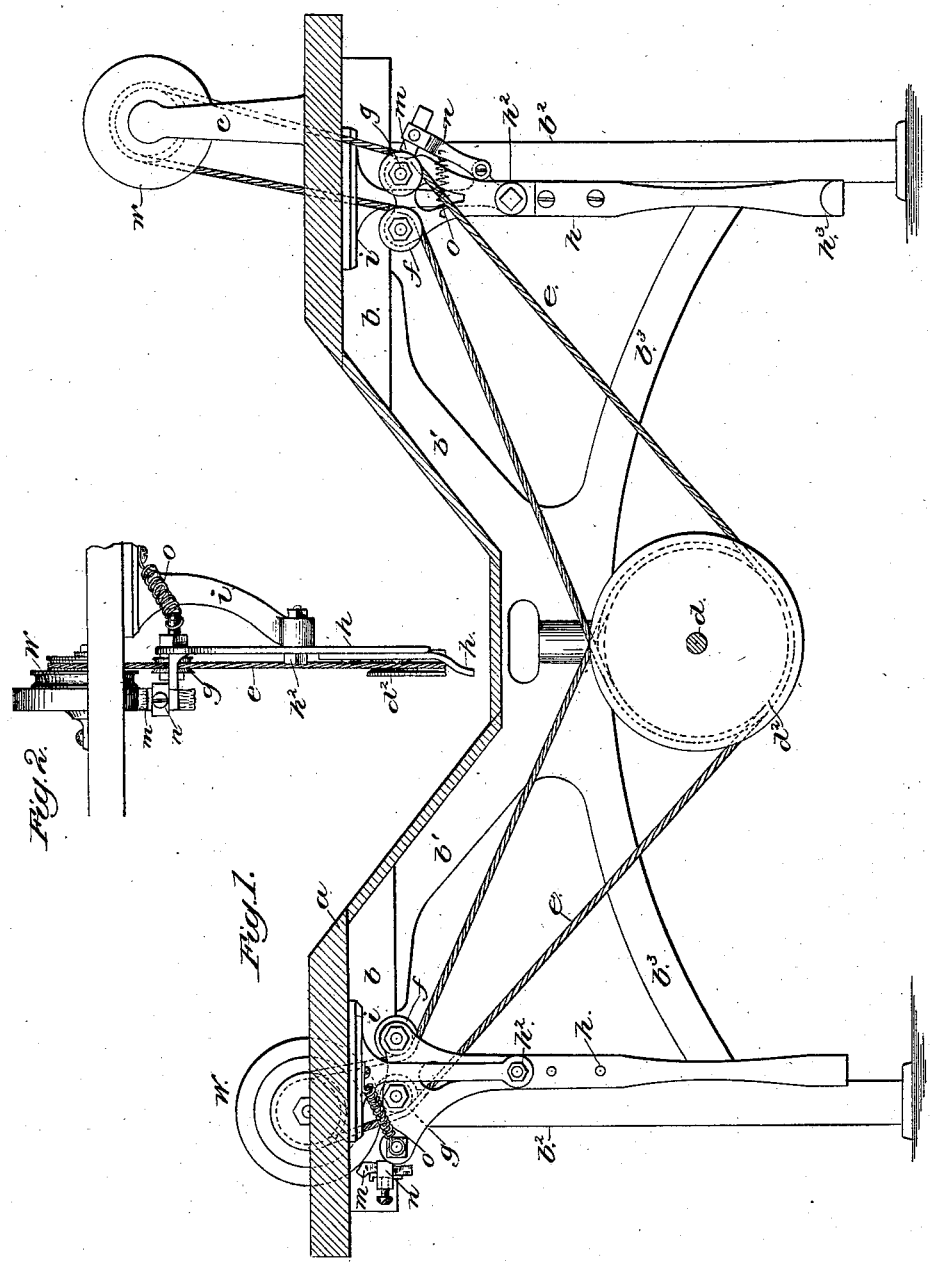

GEORGE H. PHELPS, OF NEWTON, MASSACHUSETTS.

BELT-CONTROLLING MECHANISM.

SPECIFICATION forming part of Letters Patent No. 255,450, dated March 28, 1882.

Application filed January 14, 1882. (No model.)

*To all whom it may concern:*

Be it known that I, GEORGE H. PHELPS, of of Newton, county of Middlesex, and State of Massachusetts, have invented an Improvement in Belt-Controlling Mechanisms, of which the following description, in connection with the accompanying drawings, is a specification.

My invention has for its object the production of simple mechanism whereby the belt for driving a sewing or other light machine may be quickly tightened through a lever operated by the foot or otherwise, to thus enable the machine to be driven, or when the belt is left slack to cease to operate the machine; and at the same time I prefer to provide the belt-tightening lever with a brake which will be applied directly to either the driving-belt or the flywheel of the machine being driven as soon as the belt is permitted to become slack to stop the movement of the machine. In accordance with my invention the driving-belt extended from the fly-wheel of the machine to a belt-pulley on a power-driven shaft of a shop or mill is acted upon by two sheaves carried by a lever, herein shown as pivoted to a hanger below the work-bench upon which the machine being driven stands, the said two sheaves causing the driving-belt to be strained sufficiently to exert more or less friction upon the pulley of the driven shaft and the fly-wheel, to thus insure the application to the fly-wheel of sufficient power to drive it, according to the work being done. The operator, by more or less pressure on the lever carrying the said sheaves, may regulate the amount of slippage of the belt on the fly-wheel, and consequently the speed of the machine may be kept equal to the speed of the power-shaft which moves the belt, or be made to run slower than the said power-shaft. I have provided the belt-tightening lever with a brake which, as the driving-belt is slackened sufficiently to stop the machine, will come against the driving-belt and stop it quickly; or the said brake under like circumstances may operate directly against the fly-wheel of the sewing-machine.

Figure 1 represents in cross-section a shop-bench or work-table having at opposite sides of it my belt-tightening apparatus; and Fig. 2, a view of the belt-tightener at the left of Fig. 1, looking at it from the left of said figure.

The bench or table $a$, having the central trough, is of usual shape; but instead of supporting it upon wooden beams, as heretofore, I have produced a series of metallic cross-pieces, $b$, inclined downward at $b'$, and resting at their ends on legs or uprights $b^2$, braces $b^3$ being extended from the parts $b'$ to the said legs, as shown in Fig. 1.

At the left of Fig. 1 and in Fig. 2 I have shown a belt or fly wheel, W, such as is connected with a Wheeler & Wilson No. 8 sewing-machine, and at the right of Fig. 1 a belt or fly wheel of a machine, such as the Singer or the Domestic, said wheels W being supposed to be on the main shafts of the said machines and secured thereto in any usual way.

At the right of the drawings, Fig. 1, to avoid showing a sewing-machine, I have erected a standard, $c$, to support the wheel W.

The shaft $d$, supported in suitable adjustable bearings connected with the cross-pieces $b\ b'$, but not herein shown, because not of my invention, is driven continuously by power in any usual manner, and is by me called the "power-shaft." This power-shaft, run continuously, is to be employed to run, as may be desired, any or all of the sewing-machines which are mounted upon the work-bench at each side. The power-shaft has a pulley, $d^2$, for each sewing-machine, and machines at opposite sides of the work-bench are driven from said pulleys by belts $e$, which are passed from pulleys $d^2$, about the belt-receiving parts of pulleys or fly-wheels W, of usual construction, connected with the sewing or other machines to be driven. These belts may be open or crossed, as desired. Portions of each belt between pulleys $d^2$ and pulleys or fly-wheels W are made to bear against sheaves $f\ g$, carried by a lever, $h$, pivoted at $h^2$ on a hanger, $i$, the said lever having preferably a foot-pad or projection, $h^3$. Movement of the lower end of lever $h$ by the foot, as I prefer, toward the shaft $d$ will cause the sheaves $f\ g$ to strain the belt $e$, and the machine may, as the belt $e$ is tightened, be driven more or less rapidly until the speed of the pulley or fly-wheel W is equal to the speed of the pulley $d^2$. Releasing the pressure on the lever slacks the belt $e$, so that its friction on pulley $d^2$ and fly-wheel W is insufficient to drive the fly-wheel. As the pressure of the sheaves $f$ $g$ on belt $e$ is taken off, outward movement of the lower end of lever $h$ causes the pad $m$ of arm $n$ to be pressed directly against the fly-wheel W, as at the left of Fig. 1, or against the belt, as at the right of Fig. 1, the said brake in either instance acting to immediately check the fly-wheel or the belt, preventing either of them, as the case may be, from running longer than desired. A suitable spring, $o$, keeps the brake up to its work, and normally keeps the lever $h$ in the position shown in the drawings, with the brake against the fly-wheel or band $e$. The arm $n$, carrying the brake at the right of Fig. 1, is shown as a lever; but the arm $n$ at the left of Fig. 1 is a rigid stud.

I am aware that a belt has been kept taut by the action of a sheave bearing thereon, so I do not broadly claim a sheave for such purpose.

I claim—

1. The driver-shaft and its pulley, and pulley or fly-wheel W, and belt $e$, extended over them, combined with a lever, $h$, having two sheaves adapted to be pressed against and tighten the said belt when it is desired to drive the pulley or fly-wheel, substantially as described.

2. The pulley or fly-wheel, the continuously-driven pulley $d^2$, the belt $e$, extended over them, and the lever having the two sheaves to press against the said belt to tighten it only when the fly-wheel is to be driven by the belt, combined with a brake, $m$, actuated by the said lever to assist in stopping the fly-wheel quickly when the pressure of the sheaves against the belt $e$ is released, substantially as described.

3. In a bench for sewing and other machines, the metallic cross beams or girders $b$ $b'$, shaped as shown and described, combined with the legs $b^2$ to support them, as set forth.

In testimony whereof I have signed my name to this specification in the presence of two subscribing witnesses.

GEORGE H. PHELPS.

Witnesses:
G. W. GREGORY,
BERNICE J. NOYES.